United States Patent
Hamaguchi et al.

(10) Patent No.: US 9,399,498 B2
(45) Date of Patent: Jul. 26, 2016

(54) FOOT PEDAL STRUCTURE FOR SADDLE-TYPE VEHICLE

(71) Applicant: HONDA MOTOR CO., LTD., Tokyo (JP)

(72) Inventors: Daiki Hamaguchi, Wako (JP); Taro Nishimoto, Wako (JP); Keita Mikura, Wako (JP); Rui Maeda, Wako (JP); Soya Uchida, Wako (JP); Tetsuyoshi Kikuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/592,584

(22) Filed: Jan. 8, 2015

(65) Prior Publication Data

US 2015/0197309 A1    Jul. 16, 2015

(30) Foreign Application Priority Data

Jan. 10, 2014    (JP) ................................. 2014-003478

(51) Int. Cl.
*B62L 3/04* (2006.01)
*B62J 25/00* (2006.01)
*B62K 19/38* (2006.01)

(52) U.S. Cl.
CPC .. *B62L 3/04* (2013.01); *B62J 25/00* (2013.01); *B62K 19/38* (2013.01)

(58) Field of Classification Search
CPC ........... B62J 25/00; B60N 3/063; B60N 3/06; B60N 3/066; B60T 7/06
USPC ......... 280/291, 304.3; 180/90.6; 74/539, 542, 74/594.4, 560, 523
See application file for complete search history.

(56) References Cited

U.S. PATENT DOCUMENTS

| | | | | |
|---|---|---|---|---|
| 5,476,162 A * | 12/1995 | Reed | ....................... | B60T 11/16 188/344 |
| 6,161,590 A * | 12/2000 | Wulff | ....................... | B23K 9/32 138/110 |
| 6,178,613 B1 * | 1/2001 | Monson | ..................... | B60T 7/06 29/401.1 |
| 6,719,316 B1 * | 4/2004 | Anthony | .................. | B62J 25/00 280/291 |
| 7,126,085 B1 * | 10/2006 | Boehme | .................... | B23K 9/32 219/147 |
| 7,287,773 B1 * | 10/2007 | Stahel | ...................... | B62J 25/00 280/288.4 |
| 2012/0205888 A1 * | 8/2012 | Parvey | ..................... | B62J 25/00 280/163 |
| 2012/0223505 A1 * | 9/2012 | Ikeda | ........................ | B60T 7/06 280/291 |
| 2014/0131131 A1 * | 5/2014 | Marois | ..................... | B62J 25/00 180/316 |

FOREIGN PATENT DOCUMENTS

JP     58-113597 U    8/1983

* cited by examiner

*Primary Examiner* — Tony Winner
(74) *Attorney, Agent, or Firm* — Birch, Stewart, Kolasch & Birch, LLP

(57) ABSTRACT

A foot pedal structure for a saddle-type vehicle for preventing peripheral components in the periphery of a brake pedal from being damaged even though the brake pedal and the peripheral components are not widely spaced from each other. A brake pedal includes at least an arm extending in a longitudinal direction of the vehicle from a step support member and a pedal member mounted on a distal end of the arm and extending in a vehicle widthwise direction. An upward extension in the form of a plate member extends upwardly from a treading surface of the pedal member and is disposed on an inner end of the pedal member in the vehicle widthwise direction.

20 Claims, 11 Drawing Sheets

FOOT PEDAL STRUCTURE FOR SADDLE-TYPE VEHICLE

CROSS-REFERENCE TO RELATED APPLICATIONS

The present application claims priority under 35 USC 119 to Japanese Patent Application No. 2014-003478 filed Jan. 10, 2014 the entire contents of which are hereby incorporated by reference.

BACKGROUND OF THE INVENTION

1. Field of the Invention

The present invention relates to a foot pedal structure for a saddle-type vehicle in which a step and a brake pedal are supported on a step support member.

2. Description of Background Art

A structure is known for use in saddle-type vehicles, such as motorcycles or the like, in which steps for placing thereon the feet of an occupant and a brake pedal that is operated by one of occupant's feet are supported on step brackets supported on a vehicle body frame. One known structure for use in vehicles of the above type includes a plate-like protective member disposed on a front region of the proximal portion of an arm of a brake pedal. See, for example, Japanese Unexamined Utility Model Publication No. Sho 58-113597. It is known in the art that if a component, such as an engine in Japanese Unexamined Utility Model Publication No. Sho 58-113597, protruding in a vehicle widthwise direction exists forwardly of the brake pedal, then the brake pedal is disposed to be displaced outwardly in the vehicle widthwise direction so that the brake pedal is prevented from becoming close to the component, such as an engine, when the brake is applied.

However, if the brake pedal is disposed to be displaced outwardly in the vehicle widthwise direction, an ideal riding position may possibly be obstructed. If the brake pedal is disposed not to be displaced outwardly in the vehicle widthwise direction, then the surface of the engine, an outer covering component or the like that protrudes in the vehicle widthwise direction in front of the brake pedal may possibly be damaged by the occupant's foot at the time the pedal is depressed. In particular, if the surface of the outer covering component or the like is a painted surface, then the painted surface may possibly be damaged to the extent that the damage may easily be noticed.

SUMMARY AND OBJECTS OF THE INVENTION

The present invention has been made in view of the above problems. It is an object of an embodiment of the present invention to provide a foot pedal structure for a saddle-type vehicle which prevents peripheral components in the periphery of a brake pedal from being damaged even though the brake pedal and the peripheral components are not widely spaced from each other.

To achieve the above object, according to an embodiment of the present invention a foot pedal structure for a saddle-type vehicle is provided in which a step support member (711R), supported on a vehicle body frame (F), supports a step (65R) for placing thereon a foot of an occupant and a brake pedal (68) operated by the foot of the occupant. The brake pedal (68) includes at least an arm (68B) extending in a longitudinal direction of the vehicle from the step support member (711R) and a pedal member (68C) mounted on a distal end of the arm (68B) and extending in a vehicle widthwise direction. A plate member (761) extends upwardly from a treading surface of the pedal member (68C) and is disposed on an inner end of the pedal member (68C) in the vehicle widthwise direction.

With this arrangement, since the plate member extending upwardly from the treading surface of the pedal member is disposed on the inner end of the pedal member of the brake pedal supported on the step support member in the vehicle widthwise direction, peripheral components in the periphery of the brake pedal are prevented from being damaged even though the brake pedal and the peripheral components are not widely spaced from each other in the vehicle widthwise direction.

In the above arrangement, the brake pedal (68) may further include a stay (68S) between the arm (68B) and the pedal member (68C). The pedal member (68C) and the plate member (761) may be welded to the stay (68S) and the stay (68S) may be angularly movable so that an outer end of the pedal member (68C) in the vehicle widthwise direction can point upwardly. In addition, the pedal member (68C) and the plate member (761) may be angularly moved in unison with each other when the stay (68S) is angularly moved. With this arrangement, even when the pedal member is angularly moved, the pedal member and the plate member are kept in a constant positional relationship with each other. Thus, the foot placed on the pedal member is continuously limited against movement in the vehicle widthwise direction.

In the above arrangement, the step (65R) may be angularly movable so that an outer end of the step (65R) in the vehicle widthwise direction can point upwardly. With this arrangement, the step can automatically be retracted and the pedal member can also be retracted when the vehicle body banks to the left or right at a large tilt angle.

In the above arrangement, a side cover (48R) for covering a side of a vehicle body may be positioned forwardly of the pedal member (68C), and the side cover (48R) may be positioned inwardly of a forwardly extended line (LL) of the plate member (761) in the vehicle widthwise direction. With this arrangement, since the side cover is positioned inwardly of the forwardly extended line of the plate member in the vehicle widthwise direction, the foot placed on the pedal member is prevented from contacting the side cover. Thus, the foot does not damage surfaces such as painted surfaces, etc.

In the above arrangement, the step (65R) may be disposed forwardly of an occupant seat (10). In addition, the side cover (48R) may have a wing-shaped portion (771) overlapping a rear upper portion of a front wheel (2) as viewed in a side elevation and hanging downwardly. A rear edge (772) of the wing-shaped portion (771) may have at least a portion spaced from a front edge (774) of an engine side cover (49R) covering a side of a radiator (28) in the longitudinal direction. With this arrangement, in a situation where the occupant rides the vehicle with the occupant's feet protruding forwardly, a foot of the occupant is less likely to be splashed with water from the front by the wing-shaped portion. Further, the gap created between the wing-shaped portion and the engine side cover is effective to prevent air pressure from building up in front of the radiator and to ventilate air smoothly to the radiator.

In the above arrangement, an engine side cover (49R) for covering a side of an engine (E) may be disposed inwardly of the pedal member (68C) in the vehicle widthwise direction, and the arm (68B) may be supported by an arm shaft (741) disposed rearwardly of the pedal member (68C) and may extend forwardly through an opening (705R) defined in the engine side cover (49R). The pedal member (68C) is mounted on a front end of the arm (68B). With this arrangement, since the arm supports the pedal member from a rear side and extends forwardly through the opening in the engine side cover, the arm has a rear portion covered with the engine side cover for a better appearance.

According to an embodiment of the present invention, there is provided a foot pedal structure for a saddle-type vehicle in which a step support member supported on a vehicle body frame supports a step for placing thereon a foot of an occupant and a brake pedal operable by the foot of the occupant. The brake pedal includes at least an arm extending in a longitudinal direction of the vehicle from the step support member and a pedal member mounted on a distal end of the arm and extending in a vehicle widthwise direction. A plate member, extending upwardly from a treading surface of the pedal member, is disposed on an inner end of the pedal member in the vehicle widthwise direction. Therefore, peripheral components in the periphery of the brake pedal are prevented from being damaged even though the brake pedal and the peripheral components are not widely spaced from each other in the vehicle widthwise direction.

The brake pedal further includes a stay between the arm and the pedal member. The pedal member and the plate member are welded to the stay, and the stay is angularly movable so that an outer end of the pedal member in the vehicle widthwise direction can point upwardly. The pedal member and the plate member are angularly moved in unison with each other when the stay is angularly moved. In this case, even when the pedal member is angularly moved, the pedal member and the plate member are kept in a constant positional relationship with each other. The foot placed on the pedal member is thus continuously limited against movement in the vehicle widthwise direction.

The step is angularly movable so that an outer end of the step in the vehicle widthwise direction can point upwardly. The step can thus automatically be retracted and the pedal member can also be retracted when the vehicle body banks to the left or right at a large tilt angle.

A side cover for covering a side of the vehicle body is positioned forwardly of the pedal member, and the side cover is positioned inwardly of a forwardly extended line of the plate member in the vehicle widthwise direction. In this case, the foot placed on the pedal member can be prevented from contacting the side cover. Thus, the foot is prevented from damaging surfaces such as painted surfaces, etc.

In the above arrangement, the step is disposed forwardly of an occupant seat, and the side cover has a wing-shaped portion overlapping a rear upper portion of a front wheel as viewed in side elevation and hanging downwardly. A rear edge of the wing-shaped portion has at least a portion spaced from a front edge of a radiator side cover covering a side of a radiator in the longitudinal direction. In a situation where the occupant rides the vehicle with the occupant's feet protruding forwardly, the foot of the occupant is less likely to be splashed with water from the front by the wing-shaped portion, and the gap created between the wing-shaped portion and the radiator side cover is effective to prevent an air pressure from building up in front of the radiator and to ventilate air smoothly to the radiator.

In the above arrangement, an engine side cover for covering a side of an engine is disposed inwardly of the pedal member in the vehicle widthwise direction. The arm is supported by an arm shaft disposed rearwardly of the pedal member and extends forwardly through an opening defined in the engine side cover. The pedal member is mounted on a front end of the arm. Since the arm supports the pedal member from a rear side and extends forwardly through the opening in the engine side cover, the arm has a rear portion covered with the engine side cover for a better appearance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
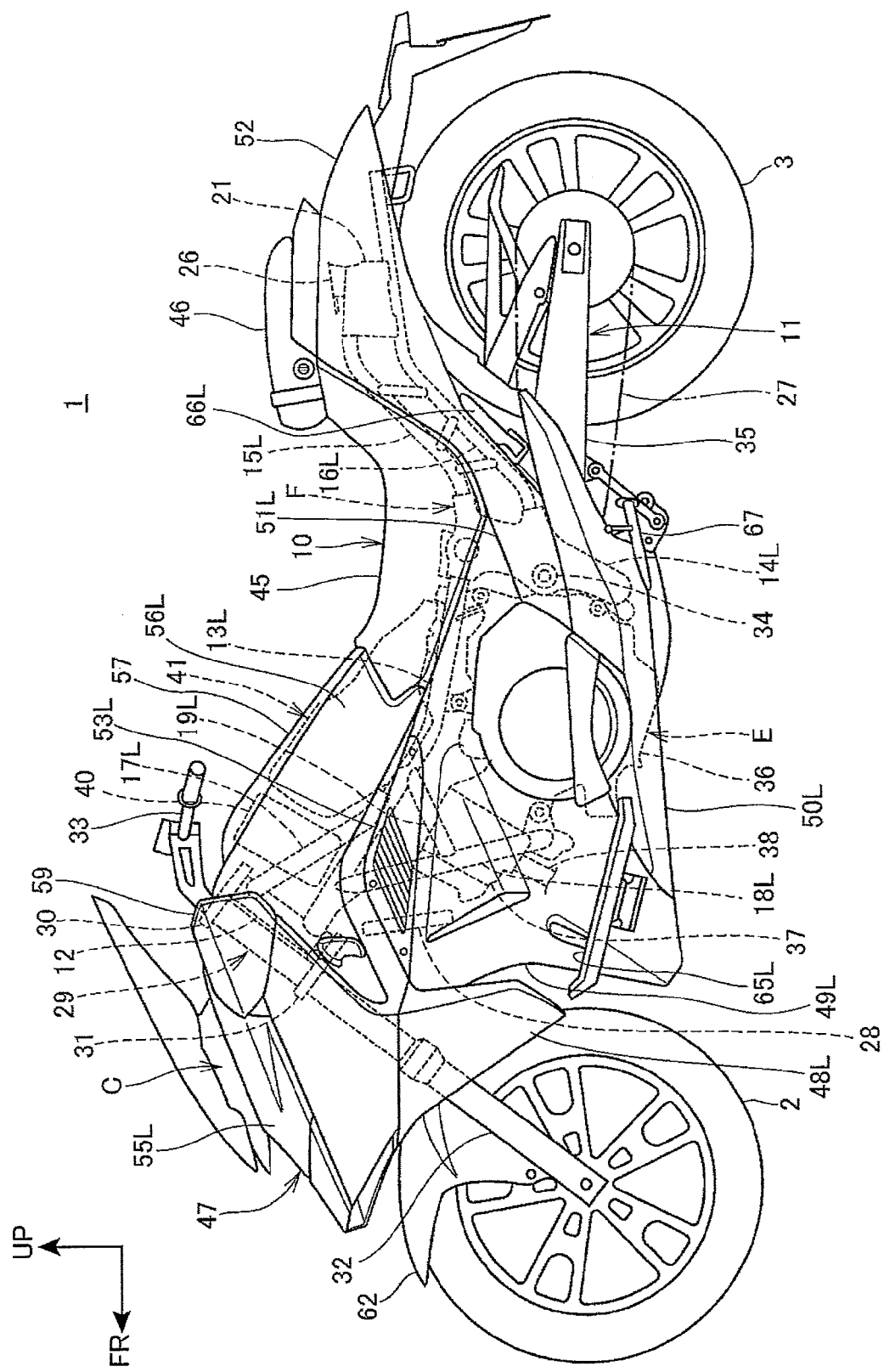
FIG. 1 is a left-hand side elevational view of a motorcycle according to an embodiment of the present invention.

A motorcycle according to an embodiment of the present invention will be described below with reference to the drawings. In the description given below, directions such as forward, rearward, horizontal, vertical, upward, and downward directions are identical to directions of the motorcycle unless otherwise specified. In the drawings, reference symbols FR refer to a forward direction of the vehicle body, UP to an upward direction of the vehicle body, and LE to a leftward direction of the vehicle body.

Figure 2:
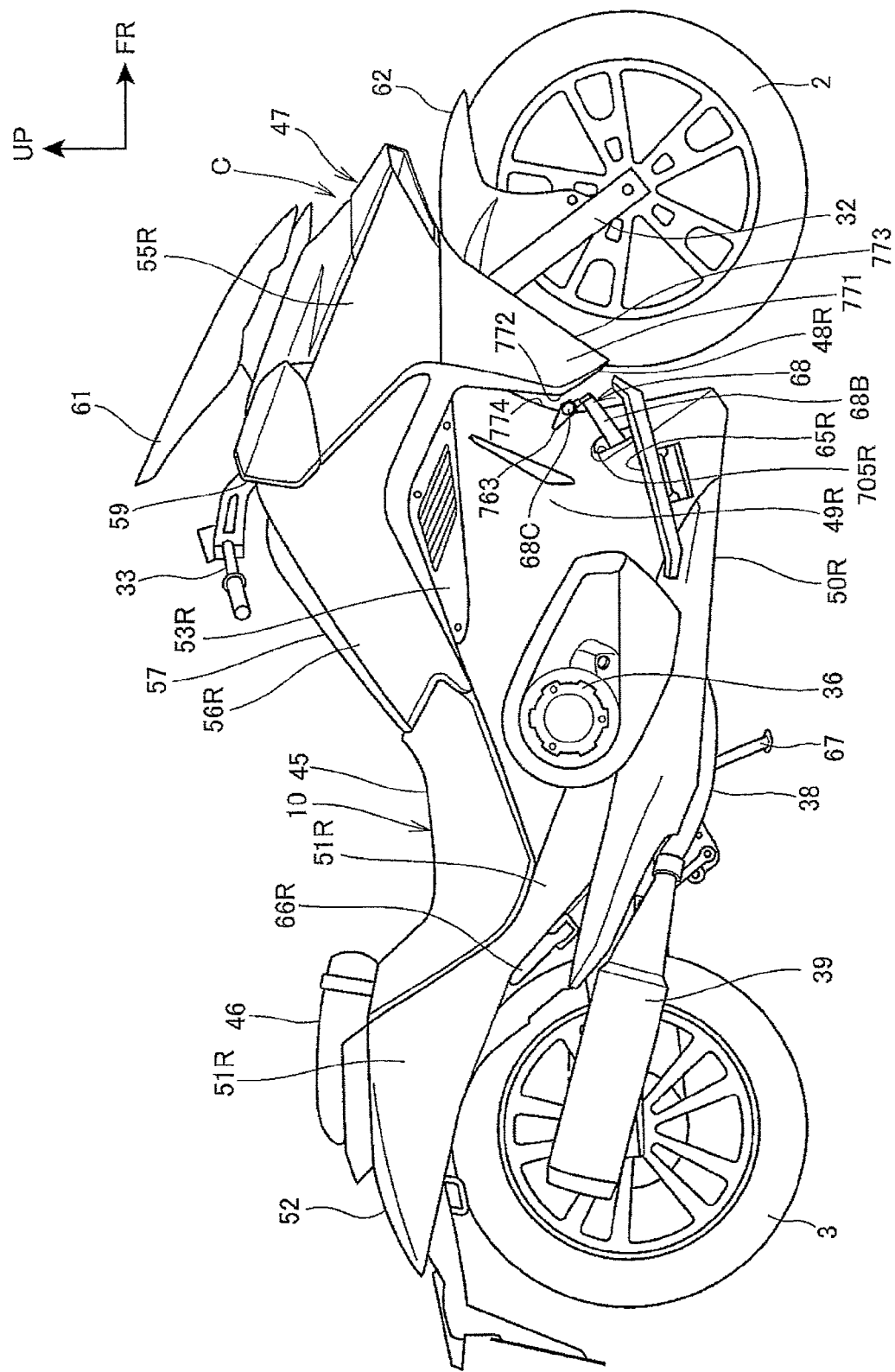
FIG. 2 is a right-hand side elevational view of the motorcycle.
Figure 3:
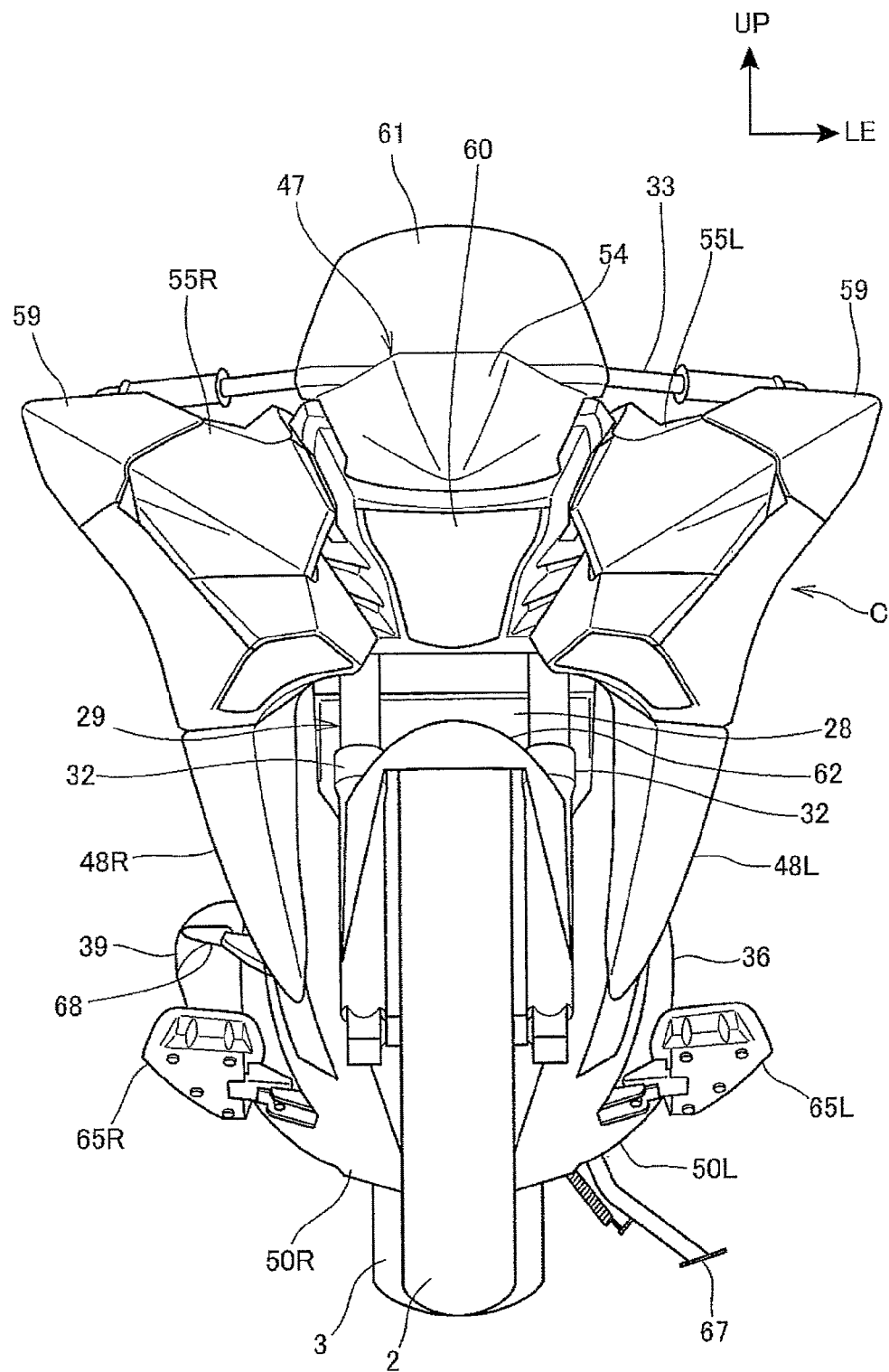
FIG. 3 is a front elevational view of the motorcycle.
Figure 4:
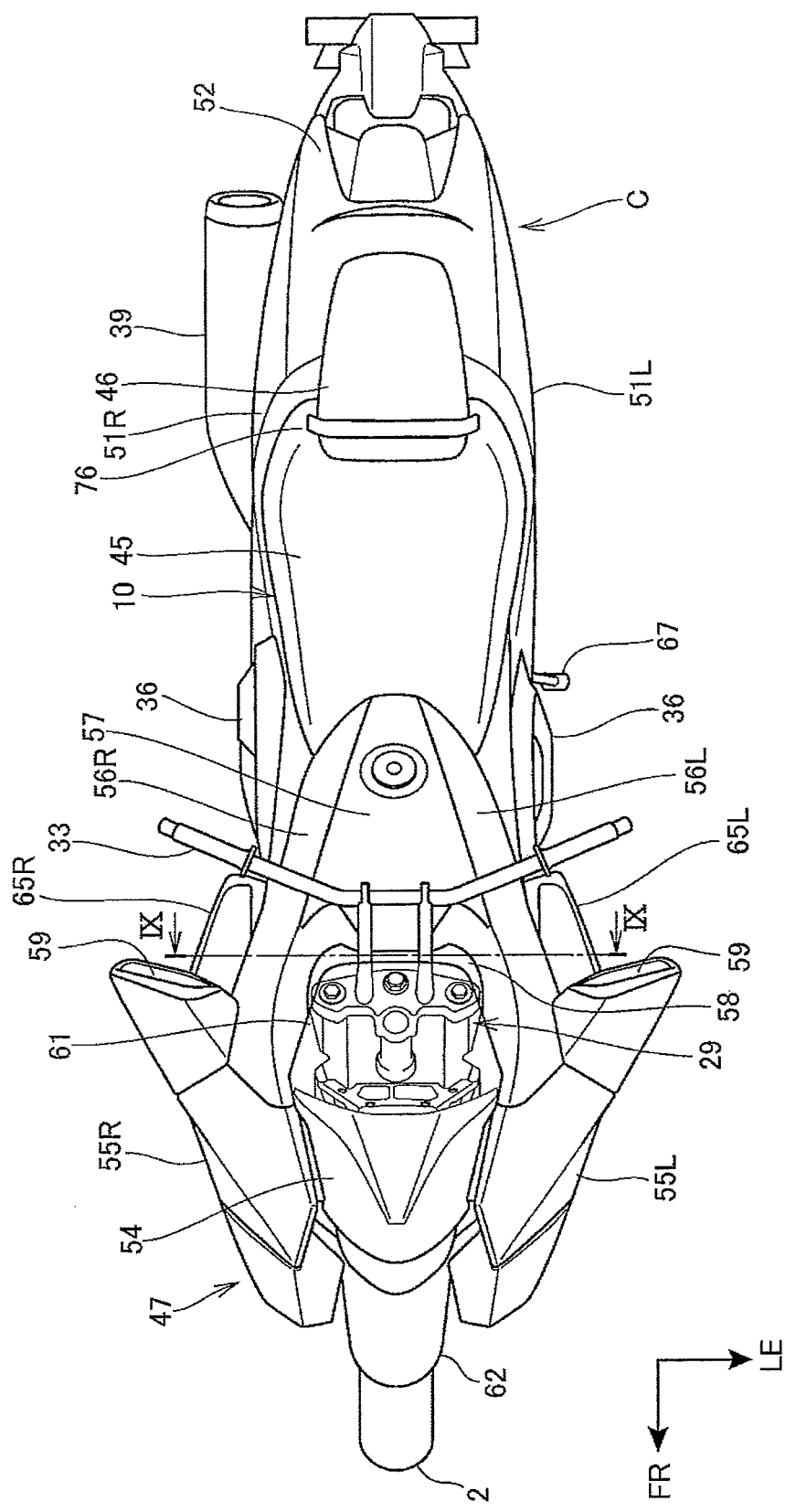
FIG. 4 is a plan view of the motorcycle.

FIG. 1 is a left-hand side elevational view of a motorcycle 1. FIG. 2 is a right-hand side elevational view of the motorcycle 1. FIG. 3 is a front view of the motorcycle 1. FIG. 4 is a plan view of the motorcycle 1.

As shown in FIGS. 1 through 4, the motorcycle 1 is a saddle-type vehicle wherein an occupant is seated astride a seat 10. The motorcycle 1 includes a front wheel 2 forwardly of a vehicle body frame F and a rear wheel 3, which serves as a drive wheel, rotatably supported on a swing arm 11 disposed on a rear portion of the vehicle. An engine E is supported on the vehicle body frame F forwardly of the seat 10. Most of the vehicle body frame F is covered with a vehicle body cover C made of resin.

Figure 5:
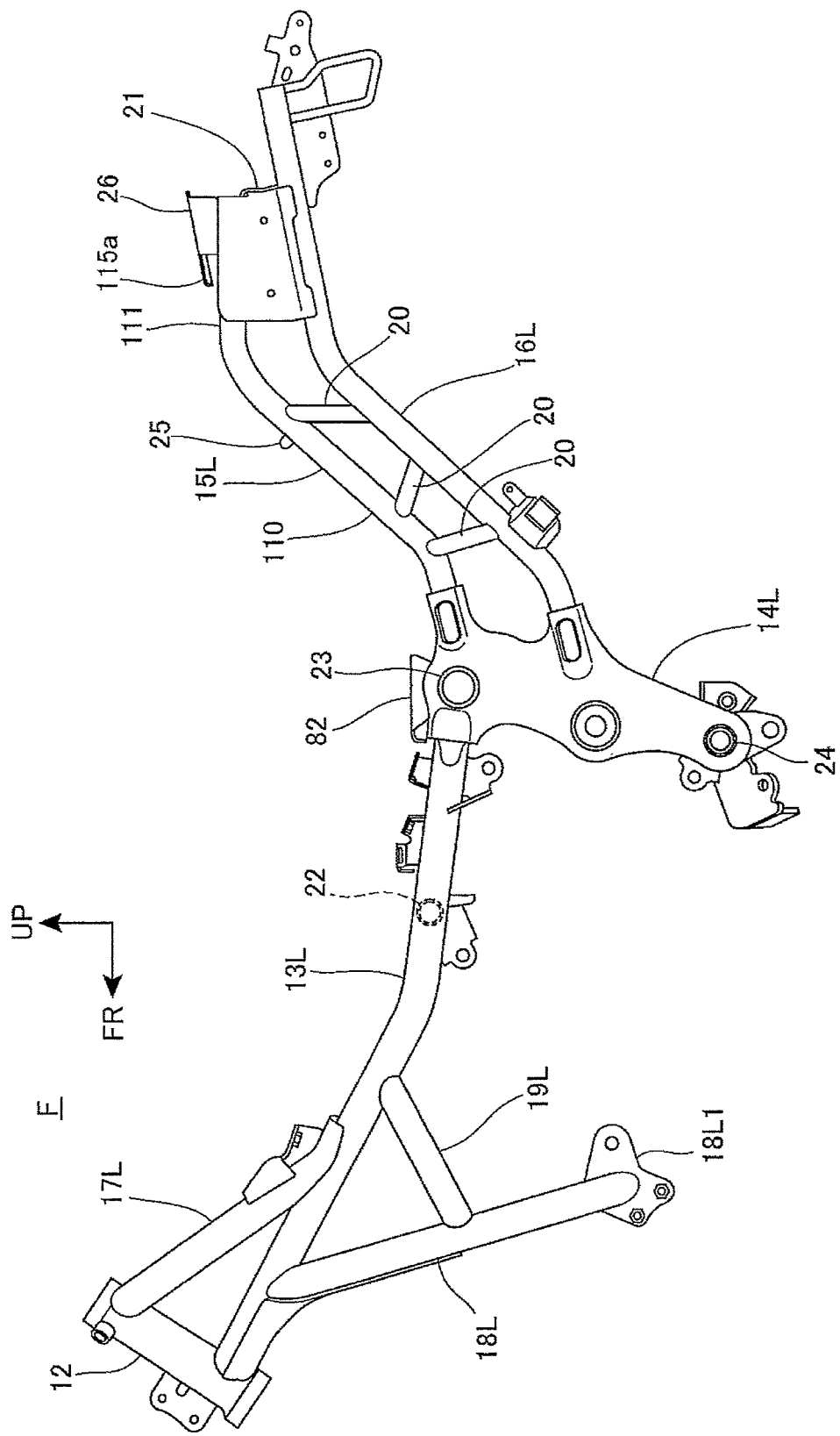
FIG. 5 is a left-hand side elevational view of a vehicle body frame.
Figure 6:
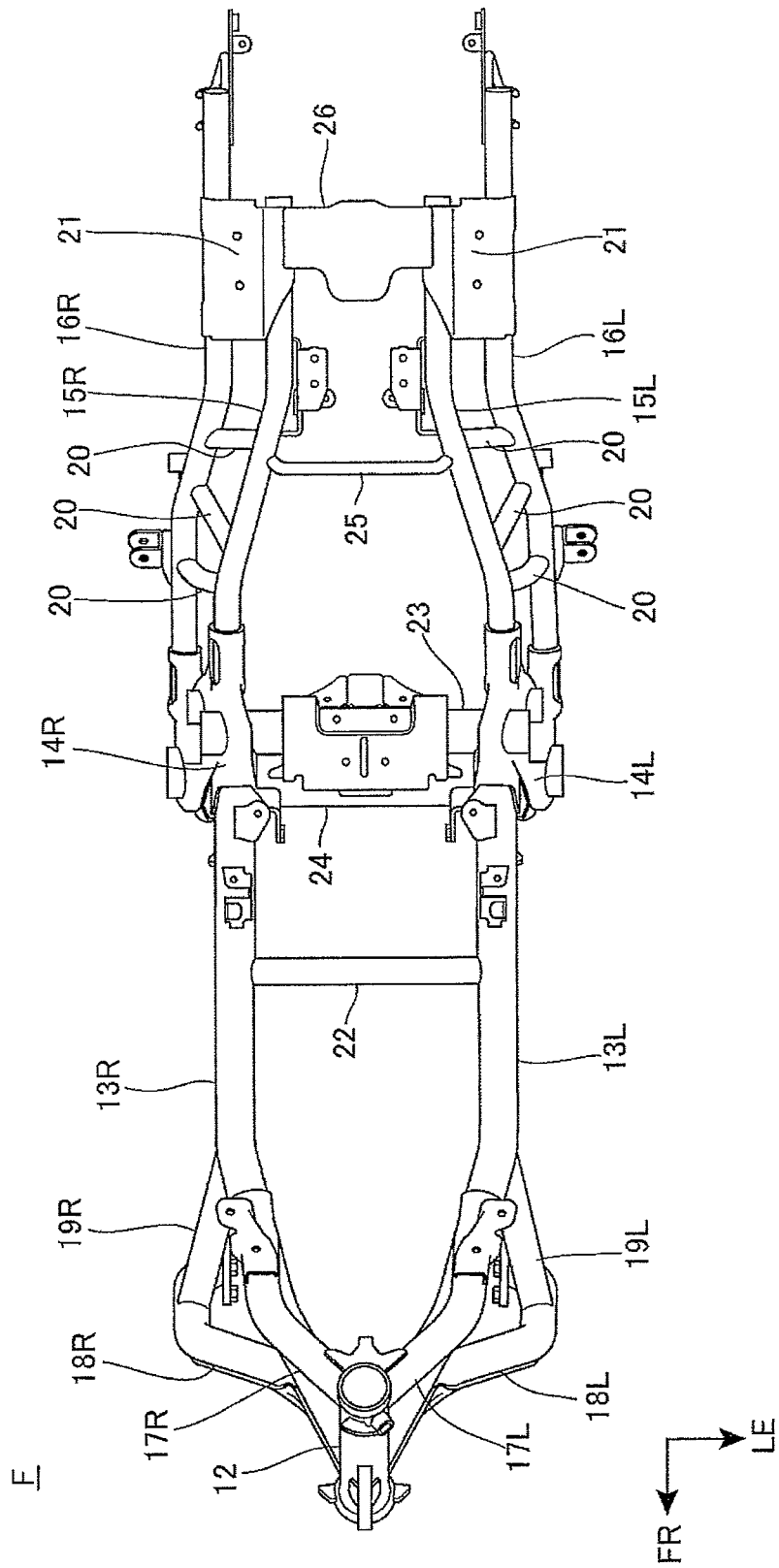
FIG. 6 is a plan view of the vehicle body frame.

FIG. 5 is a left-hand side elevational view of the vehicle body frame F. FIG. 6 is a plan view of the vehicle body frame F. As shown in FIGS. 1 through 6, the vehicle body frame F is constructed of a plurality of pipes and plates of metal joined together by welding or the like. The vehicle body frame F includes a head pipe 12 disposed on the front end thereof, a pair of left and right main frames 13L and 13R branched from a lower portion of the head pipe 12 into left and right and extending downwardly and rearwardly, a pair of left and right pivot frames 14L and 14R extending downwardly respectively from the rear ends of the main frames 13L and 13R, a pair of left and right seat frames 15L and 15R extending upwardly and rearwardly from upper portions of the pivot frames 14L and 14R, respectively, and a pair of left and right rear frames 16L and 16R extending upwardly and rearwardly from vertically intermediate portions of the pivot frames 14L and 14R, respectively, and joined respectively to the seat frames 15L and 15R.

The vehicle body frame F also includes a pair of left and right gusset frames 17L and 17R extending downwardly and rearwardly from an upper portion of the head pipe 12 and joined respectively to front portions of the main frames 13L and 13R, a pair of left and right engine hangers 18L and 18R extending as frame members rearwardly and downwardly from the respective front portions of the main frames 13L and 13R, and a pair of left and right support frames 19L and 19R extending rearwardly and upwardly from vertically intermediate portions of the engine hangers 18L and 18R, respectively, and joined respectively to the main frames 13L and 13R.

The rear frames 16L and 16R are disposed outwardly of the seat frames 15L and 15R in a vehicle widthwise direction and downwardly of the seat frames 15L and 15R, and extend rearwardly along the seat frames 15L and 15R. The rear frames 16L and 16R have respective rear ends positioned rearwardly of the rear ends of the seat frames 15L and 15R. The seat frames 15L and 15R and the rear frames 16L and 16R are joined to each other by a plurality of reinforcing frames 20 each in the form of a pipe.

The rear ends of the seat frames 15L and 15R and the rear portions of the rear frames 16L and 16R are joined by a pair of left and right reinforcing plates 21 that cover outer sides of the seat frames 15L and 15R and the rear frames 16L and 16R in the vehicle widthwise direction.

The vehicle body frame F is provided with a plurality of cross frames extending in the vehicle widthwise direction and interconnecting the left and right frames. More specifically, the cross frames include a front cross frame 22 interconnecting the main frames 13L and 13R, an upper cross frame 23 interconnecting the upper portions of the pivot frames 14L and 14R, a lower cross frame 24 interconnecting lower portions of the pivot frames 14L and 14R, a rear cross frame 25 interconnecting longitudinally intermediate portions of the seat frames 15L and 15R, and a rear end cross frame 26 in the form of a plate interconnecting the rear ends of the seat frames 15L and 15R. The rear end cross frame 26 has left and right ends joined respectively to upper surfaces of the reinforcing plates 21.

The motorcycle 1 has a steering system 29 for steering the front wheel 2. The steering system 29 includes a steering shaft, not shown, rotatably supported by the head pipe 12, a top bridge 30 joined to the upper end of the steering shaft, a bottom bridge 31 joined to the lower end of the steering shaft, and a pair of left and right front forks 32 supported by the top bridge 30 and the bottom bridge 31. The steering system 29 also includes a steering handlebar 33 provided to an upper portion of the top bridge 30. The front wheel 2 is rotatably supported on the lower ends of the front forks 32.

The swing arm 11 is swingably supported by a pivot shaft 34 that is inserted in and extends between the left and right pivot frames 14L and 14R. The swing arm 11 has a pair of left and right arms 35 having respective front ends rotatably supported by the pivot shaft 34 and extending rearwardly to positions alongside of the rear wheel 3, and a joint, not shown, joining front portions of the left and right arms 35. The rear wheel 3 is rotatably supported between the rear ends of the left and right arms 35.

A rear shock absorber unit, not shown, is coupled to and extends between the swing arm 11 and the upper cross frame 23.

The engine E is a four-stroke engine having a plurality of parallel cylinders. The engine E includes a crankcase 36 having a crankshaft, not shown and a cylinder block 37 tilted forwardly and extending upwardly from an upper front portion of the crankcase 36. The crankcase 36 incorporates in a rear portion thereof a transmission, not shown, for transmitting power from the engine E to the rear wheel 3. The engine E has its output transmitted through a drive chain 27 to the rear wheel 3.

The engine E is coupled to the engine hangers 18L and 18R, the main frames 13L and 13R, and the pivot frames 14L and 14R, and is mounted in a suspended fashion on the vehicle body frame F. The cylinder block 37 is disposed between the left and right engine hangers 18L and 18R.

An exhaust pipe 38, that extends from a front surface of the cylinder block 37, is bent and extends rearwardly and is connected to a muffler 39 which is located on a right-hand side of the rear wheel 3. A radiator 28 for cooling the coolant of the engine E is positioned in front of the cylinder block 37 and below the head pipe 12.

An air cleaner box 40 is disposed above the cylinder block 37 and rearwardly of the head pipe 21, and is connected to an intake port of the cylinder block 37 through a connecting tube, not shown, and a throttle body, not shown.

A fuel tank 41 is disposed rearwardly of the air cleaner box 40 adjacent thereto, and is supported on the main frames 13L and 13R.

The seat 10 includes a main seat 45 for a rider to be seated thereon and a rear seat 46 for a pillion passenger to be seated. The main seat 45 is disposed contiguously to a rear portion of the fuel tank 41 and is supported on the main frames 13L and 13R. The rear seat 46 is disposed in a position rearwardly of the main seat 45 and higher than the main seat 45.

A pair of left and right steps 65L and 65R for the rider are disposed forwardly of the engine E and below the handlebar 33. The rider who has been seated on the main seat 45 has his or her feet placed on the steps 65L and 65R, bending his or her leg portions beneath the knees forwardly to orient the legs forwardly. A brake pedal 68 for braking the rear wheel 3 is positioned forwardly of a front portion of the right step 65R.

The pillion passenger on the rear seat 46 has his or her feed placed on a pair of left and right pillion passenger steps 66L and 66R disposed below the rear seat 46.

The vehicle body cover C includes a front cover 47 extending from a position above the front wheel 2 to the fuel tank 41 in covering relation to a wide front region of the vehicle around the head pipe 12, and a pair of left and right front lower side covers 48L and 48R extending downwardly from left and right front portions of the front cover 47 in covering relation to an upper rear portion of the front wheel 2 on its opposite sides. The vehicle body cover C also includes a pair of left and right engine side covers 49L and 49R extending from a position rearwardly of the front wheel 2 to the pivot frames 14L and 14R in covering relation to the engine E and the pivot frames 14L and 14R on opposite sides thereof.

The vehicle body cover C further includes a pair of left and right under covers 50L and 50R contiguous to respective lower edges of the engine side covers 49L and 49R and extending from below the engine E to a front portion of the swing arm 11, and a pair of left and right rear side covers 51L and 51R covering areas from the pivot frames 14L and 14R to the rear ends of the rear frames 16L and 16R. The vehicle body cover C also includes a tail cover 52 disposed between rear ends of the rear side covers 51L and 51R, and a pair of left and right ventilation covers 53L and 53R disposed between rear portions of the front cover 47 and front portions of the engine side covers 49L and 49R and having ventilation holes defined therein.

The engine side covers 49L and 49R have respective upper edges extending along the lower edges of the rear portions of the front cover 47 and lower edges of the main seat 45. The rear side covers 51L and 51R have front ends positioned between rear ends of the engine side covers 49L and 49R and the under covers 50L and 50R. The crankcase 36 has a portion uncovered by the vehicle body cover C, but exposed laterally on its right and left sides.

The front cover 47 includes a front cover portion 54 disposed forwardly of the head pipe 12, a pair of left and right side cover portions 55L and 55R covering front and side regions of an area in front of the head pipe 12, a pair of left and right tank cover portions 56L and 56R covering the air cleaner box 40 and the fuel tank 41 on their sides rearwardly of the head pipe 12, and an upper cover portion 57 interconnecting the tank cover portions 56L and 56R laterally and covering the air cleaner box 40 and the fuel tank 41 from above.

The front cover portion 54, the side cover portions 55L and 55R, the tank cover portions 56L and 56R, and the upper cover portion 57 are disposed in surrounding relation to the head pipe 12, jointly making up the front cover 47. The front cover 47 defines a space 58 (FIG. 4) centrally therein wherein the steering system 29 is angularly movable.

A pair of left and right side mirrors 59 are integrally formed with the left and right ends of upper portions of the side cover portions 55L and 55R.

A head light 60 is mounted in the front cover portion 54. A windscreen 61 is mounted on a rear portion of the front cover 54.

A front fender 62 is fixed to the front forks 32. A side stand 67 is mounted on the left pivot frame 14L. When the motorcycle 1 is parked with the aid of the side stand 67, the motorcycle 1 is inclined to the left.

Figure 7:
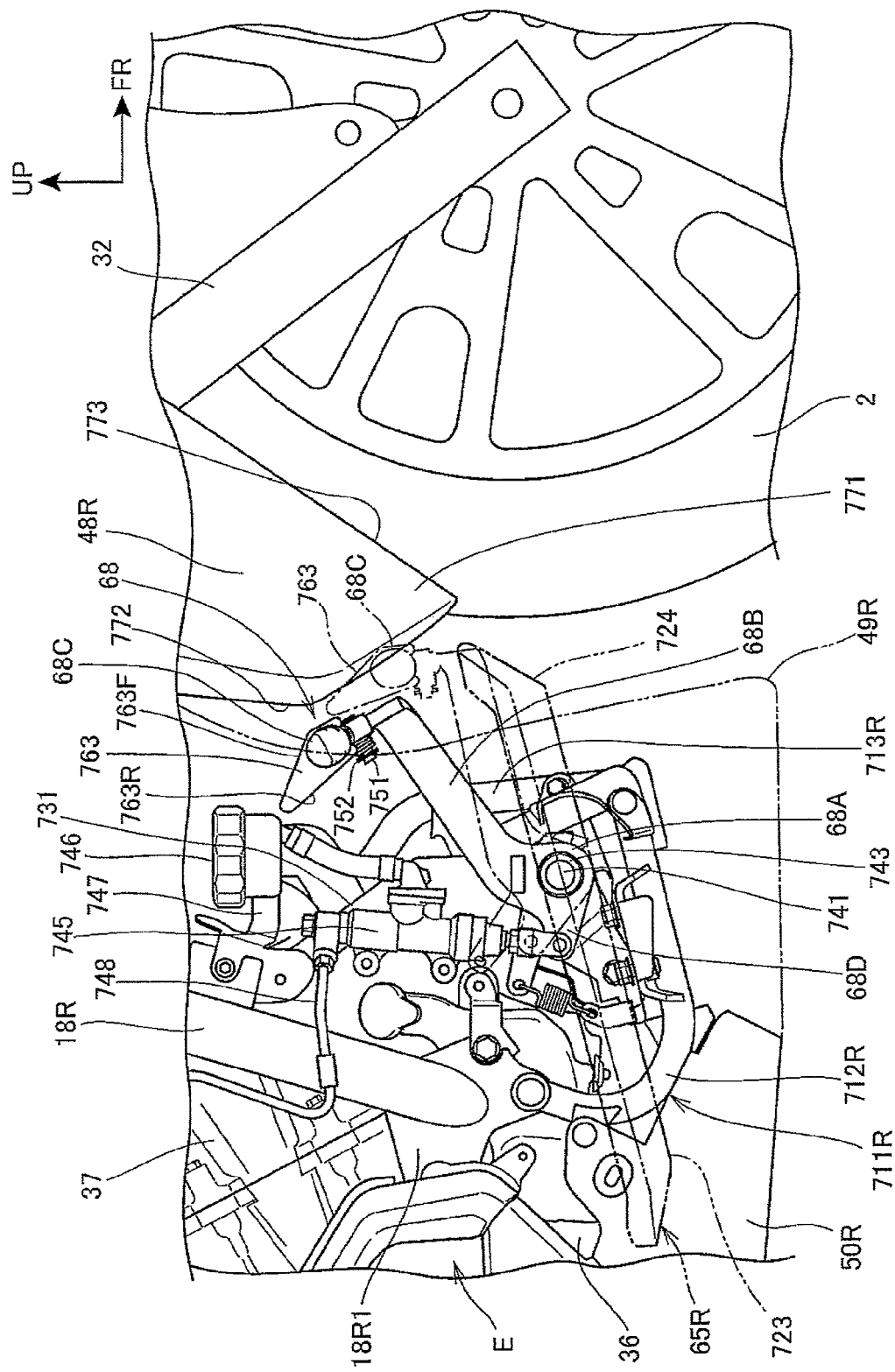
FIG. 7 is a view of a brake pedal and peripheral components as seen from a right side of the vehicle body.
Figure 8:
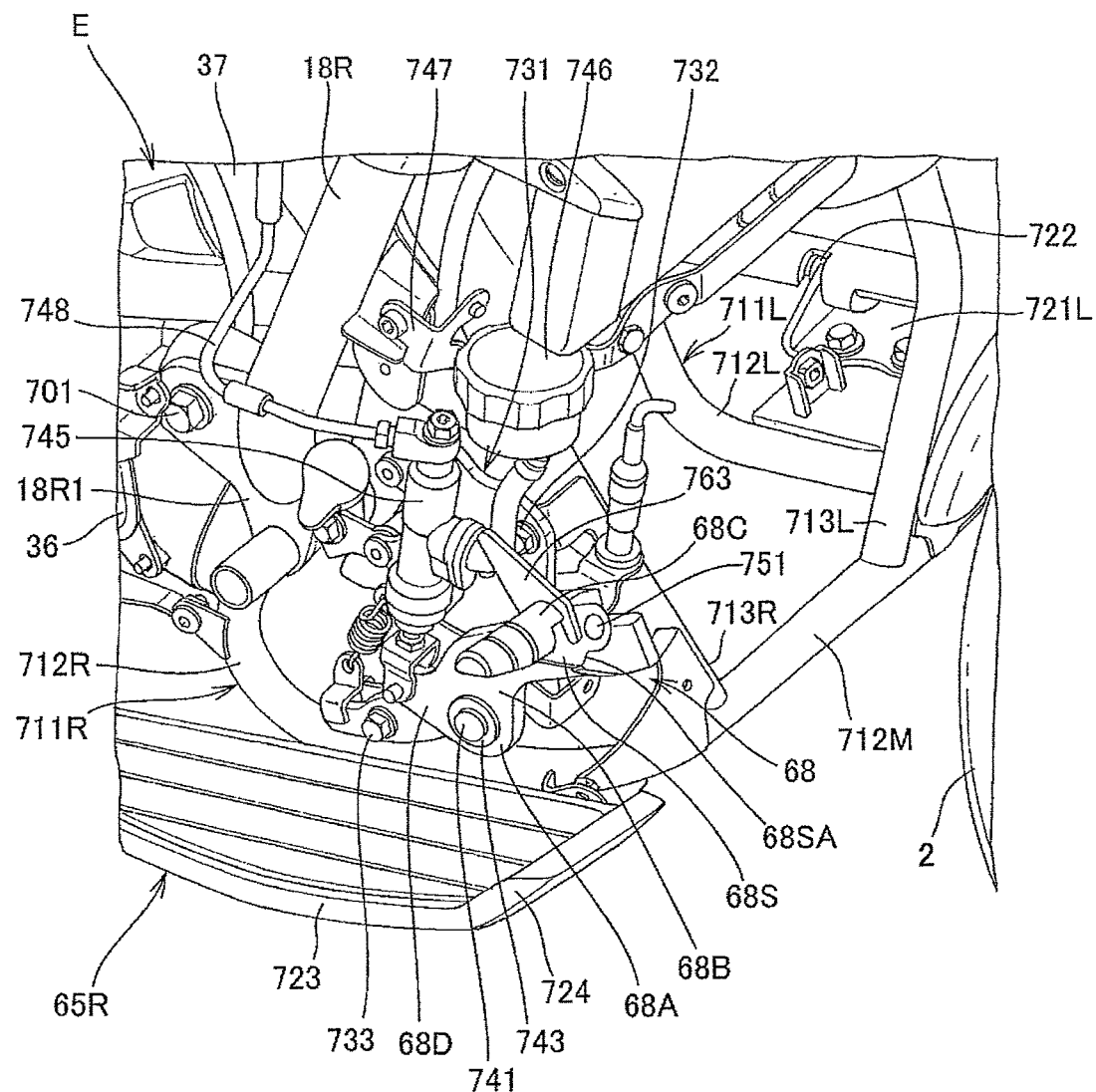
FIG. 8 is a perspective view of the brake pedal and the peripheral components as seen from the upper right side.

FIG. 7 is a view of the brake pedal 68 and peripheral components as seen from a right side of the vehicle body. FIG. 8 is a perspective view of the brake pedal 68 and the peripheral components as seen from the upper right side. For illustrative purposes, the engine side cover 49R is shown by the two-dot-and-dash lines in FIG. 7, and omitted from illustration in FIG. 8.

As shown in FIGS. 7 and 8, the right engine hanger 18R is disposed outwardly of the cylinder block 37 of the engine E in the vehicle widthwise direction and below the cylinder block 37, and is disposed between the engine E and the front wheel 2. The engine hanger 18R has a lower end integral with a flange 18R1 fixed to a front lower portion of the cylinder block 37 by a bolt 701 (fastener) shown in FIG. 8.

The left engine hanger 18L is of a structure that is bilaterally symmetrical with the engine hanger 18R. The engine hanger 18L has a lower end integral with a flange 18L1 (see FIG. 5) fixed to a front lower portion of the cylinder block 37 by a bolt, not shown.

The right step 65R is supported by a step support member 711R which is mounted on the right engine hanger 18R. The step support member 711R has a first subframe 712R extending rearwardly and downwardly from the flange 18R1 and then curved and extending straight forwardly, and a second subframe 713R extending forwardly and downwardly from the engine hanger 18R and bridging the gap between the engine hanger 18R and the first subframe 712R. The first and second subframes 712R and 713R jointly make up a U-shaped frame curved projectingly in the forward direction from the right engine hanger 18R as viewed in side elevation, within a space which is open forwardly of the crankcase 36 and downwardly of the cylinder block 37 as viewed in side elevation. The strength of the step support member 711R itself is efficiently increased by the strength of the engine hanger 18R.

Figure 9:
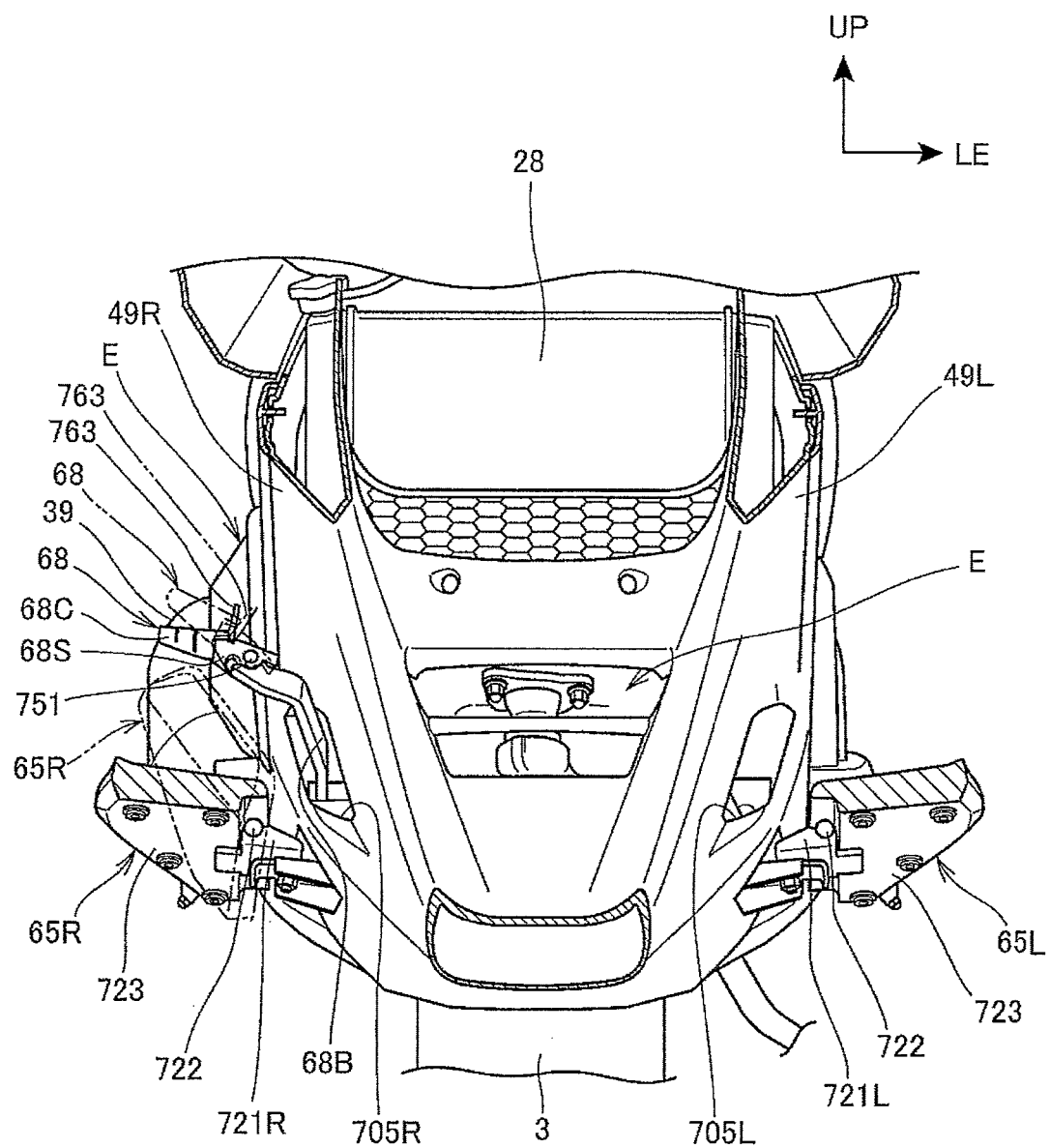
FIG. 9 is a cross-sectional view taken along line IX-IX of FIG. 4.

FIG. 9 is a view of the left and right steps 65L and 65R and peripheral components as seen from the front of the vehicle body, i.e., a cross-sectional view taken along line IX-IX of FIG. 4. As shown in FIGS. 7 through 9, the right step 65R is supported on a straight portion, which extends longitudinally of the vehicle, of the first subframe 712R by a step bracket 721R (see FIG. 9). Since the left and right steps 65L and 65R are disposed forwardly of the engine E, they are disposed forwardly of the seat 10 (occupant seat), as can be seen from FIG. 1, etc.

As shown in FIG. 9, the step bracket 721R supports a shaft (angularly movable shaft) 722 that extends longitudinally of the vehicle. The step 65R has a proximal end (an inward end in the vehicle widthwise direction) angularly movably supported by the shaft 722. Therefore, the step 65R can be freely tilted (folded) upwardly about the shaft 722. The step 65R is thus angularly movable between an ordinary position (indicated by the solid lines in FIG. 9) in which the outer end of the step 65R in the vehicle widthwise direction projects the most outwardly in the vehicle widthwise direction with an upper surface of the step 65R lying substantially horizontally, and a retracted position (indicated by the two-dot-and-dash lines in FIG. 9) in which the outer end of the step 65R in the vehicle widthwise direction is turned so as to point upwardly.

The left engine hanger 18L also has a step support member 711L (in FIG. 8, a first subframe 712L, a second subframe 713L, a step bracket 721L, etc.) that is bilaterally symmetrical with the step support member 711R. The step 65L is vertically swingably supported on the first subframe 712L of the left step support member 711L by a shaft 722. The left and right steps 65L and 65R are normally biased into the ordinary positions by resilient members (return springs), not shown, so that they are kept in the ordinary positions unless external forces are applied.

When the motorcycle 1 banks to the left or right, travels on rough terrain, or the like, even if the steps 65L and 65R touch the ground, it is possible to retract the steps 65L and 65R without counteracting external forces from the ground.

As shown in FIG. 8, the left and right first subframes 712L and 712R are formed by bending a common pipe. Therefore, the left and right step support members 711L and 711R are integrally joined together by a bridge frame 712M (see FIG. 8) extending in the vehicle widthwise direction between the first subframes 712L and 712R. The strength of the left and right step support members 711L and 711R is thus efficiently increased, and they can easily be mounted on the vehicle body frame F.

Since the step 65R is bilaterally symmetrical with the step 65L, the step 65R will be described in detail below. As shown in FIGS. 7 and 8, the step 65R has a foot placement member 723 extending forwardly and upwardly along a straight portion of the first subframe 712R which extends in the longitudinal direction and a foot rest 724 extending further forwardly and upwardly at a different angle from the front end of the foot placement member 723. The foot rest 724 has its angle of tilt and its position set so as to be contiguous to a forwardly and downwardly extending front edge 773 (see FIG. 7) of the front lower side cover 48R on the front portion of the vehicle body. As the step 65R extends forwardly and upwardly, the occupant finds it easy to place the foot protruding forwardly on the step 65R and also to support its body.

As shown in FIG. 8, a pedal bracket 731 that supports the brake pedal 68 is fixed to the right step support member 711R. The pedal bracket 731 is composed of a plate of metal that vertically extends to bridge the gap between the first and second subframes 712R and 713R, and is fixed to the first and second subframes 712R and 713R by a pair of upper and lower bolts (fasteners) 732 and 733.

The brake pedal 68 is angularly movably supported on a front portion of the pedal bracket 731 by a shaft (angularly movable shaft) 741 that extends in the vehicle widthwise direction. The brake pedal 68 is thus vertically swingable about the shaft 741.

The brake pedal 68 is normally biased to turn counterclockwise as viewed in right-hand side elevation by a resilient member 742 that functions as a return spring, so that a pedal member 68C on the front end of the brake pedal 68 can be swingably moved from an unbraked position indicated by the solid lines in FIG. 7 to a braked position indicated by the two-dot-and-dash lines in FIG. 7. A retaining ring 743 functioning as a retainer is mounted on the shaft 741 to prevent the brake pedal 68 from being dislodged. A master cylinder 745 that extends vertically is supported on the rear portion of the pedal bracket 731.

The brake pedal 68 has an arm 68B extending forwardly and upwardly from a proximal end 68A that is supported on the pedal bracket 731 by the shaft 741. The brake pedal 68 has the pedal member 68C on the front end of the arm 68B.

As shown in FIG. 9, the left and right engine side covers 49L and 49R have respective openings 705L and 705R defined therein which are open forwardly. The left and right openings 705L and 705R are disposed forwardly of the engine E and downwardly of the radiator 28, and introduce ambient air from the front of vehicle body into the vehicle body cover C toward the engine E.

According to the present embodiment, the arm 68B of the brake pedal 68 extends forwardly through the right opening 705R and is exposed out of the engine side cover 49R. Therefore, there is no need for an opening dedicated for the arm 68B. Since the portion (the proximal end 68A and an extension 68D to be described later) of the arm 68B remote from the pedal member 68C is covered with the engine side cover 49R, that portion of the arm 68B is concealed from view.

The pedal member 68C is an operable member which the occupant operates with his or her foot (in the present arrangement, the right foot). When the pedal member 68C is depressed, the master cylinder 745 whose lower end is coupled to the extension 68D that extends rearwardly from the proximal end 68A is actuated. When the master cylinder 745 is actuated, the brake of the rear wheel 3 is operated. More specifically, an oil pressure developed by the master cylinder 745 is transmitted to the brake of the rear wheel 3 through a brake pipe 748 that extends rearwardly from the upper end of the master cylinder 745, hydraulically operating the brake of the rear wheel 3.

The master cylinder 745 is separate from a reservoir tank 746 for storing brake oil. The reservoir tank 746 is directly supported on the engine hanger 18R by a stay 747.

According to the present embodiment, the brake of the rear wheel 3 is a hydraulic brake. However, the brake of the rear wheel 3 may not be a hydraulic brake. If the brake of the rear wheel 3 is a wire-driven brake, then a brake wire for operating the rear wheel brake may be supported on a region of the pedal bracket 731 which corresponds to the master cylinder 745, and the tip end of the brake wire may be coupled to the brake pedal 68.

Figure 10:
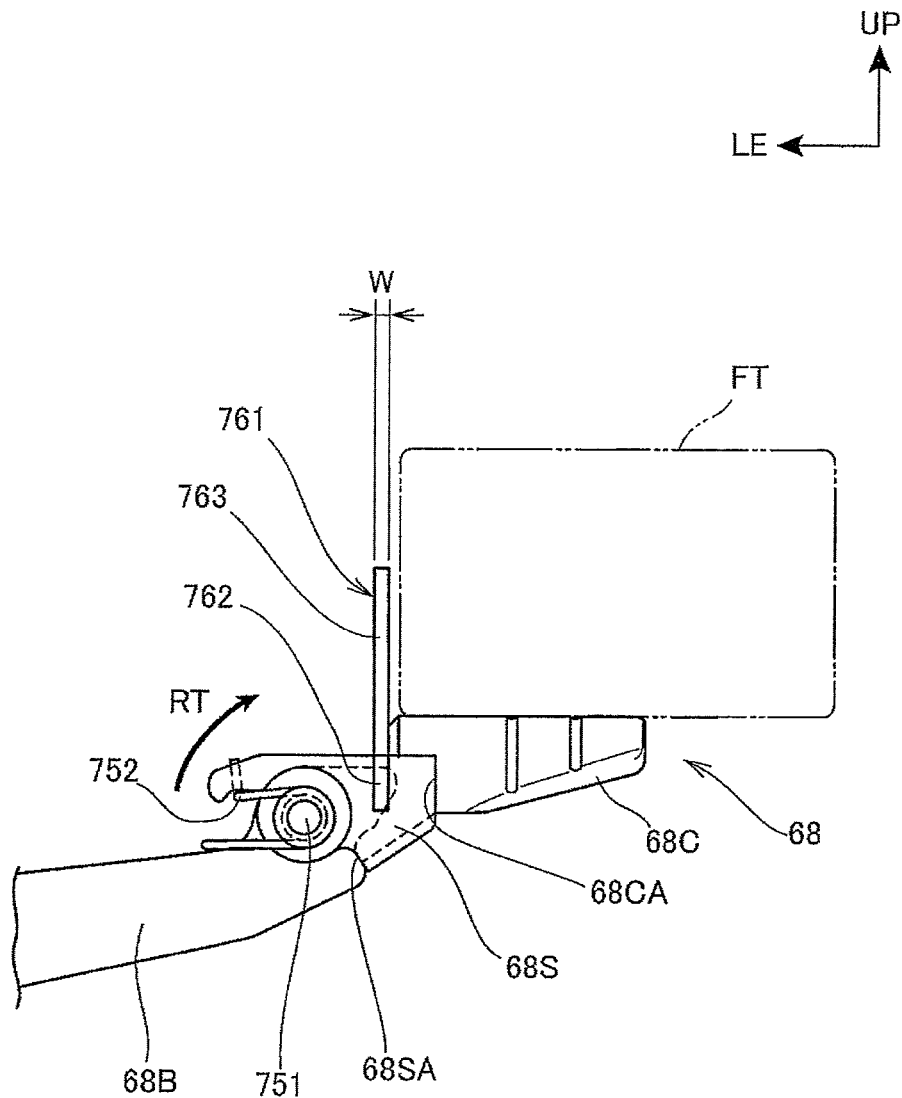
FIG. 10 is a view of a pedal member and peripheral components as seen from the rear side.

FIG. 10 is a view of the pedal member 68C and peripheral components as seen from the rear side.

As shown in FIGS. 9 and 10, a stay 68S functioning as a foldable hinge is disposed between the arm 68B and the pedal member 68C. The arm 68B has its front end portion bent outwardly in the vehicle widthwise direction, and a shaft 751 extending in the longitudinal direction of the vehicle is angularly movably supported on the outer end of the bent front end portion of the arm 68B. The stay 68S is formed by pressing a metal plate to a shape which extends in the longitudinal direction in laterally covering relation to the front end portion of the arm 68B. The shaft 751 extends rearwardly from a front side of the vehicle body through an area where the stay 68S and the arm 68B overlap each other, and is integrally joined to the stay 68S. The stay 68S is thus angularly movable with the shaft 751 about its axis.

The stay 68S is biased to turn in the direction (clockwise) indicated by a reference symbol RT in FIG. 10 by a resilient member 752 (return spring) mounted on the shaft 751. The stay 68S has a limiter 68SA which, when the stay 68S is turned in the direction RT, abuts against the front end of the arm 68B to prevent the stay 68S from being turned further. The position beyond which the stay 68S is limited against further angular movement by the limiter 68SA serves as an ordinary position in which the outer end of the pedal member 68C mounted on the stay 68S in the vehicle widthwise direction projects most outwardly in the vehicle widthwise direction with an upper surface of the pedal member 68C lying substantially horizontally.

The pedal member 68C is thus movable between the ordinary position and a retracted position (indicated by the two-dot-and-dash lines in FIG. 9) in which the outer end of the pedal member 68C in the vehicle widthwise direction is turned so as to point upwardly. Therefore, as with the step 65R, when the motorcycle 1 banks to the right or travels on rough terrain or the like, it is possible to retract the pedal member 68C upwardly without counteracting external forces from the ground.

The pedal member 68C is made of a metal material which is rigid, such as iron or the like. The pedal member 68C is welded to the outer end of the stay 68S in the vehicle widthwise direction. An upward extension 761 (plate member) of metal which extends upwardly beyond an upper surface, serving as the treading surface, of the pedal member 68C is welded to the stay 68S inwardly of the pedal member 68C in the vehicle widthwise direction.

More specifically, the pedal member 68C has a recess 68CA defined in a proximal end thereof so as to be recessed outwardly in the vehicle widthwise direction. While the recess 68CA is fitting over the outer end of the stay 68S in the vehicle widthwise direction, the pedal member 68C is welded to the stay 68S. The pedal member 68C is thus easily positioned and fixed in position.

The upward extension 761 is made of a plate of a metal material which is rigid, such as iron or the like. The upward extension 761 has a lower portion 762 mounted on the stay 68S and an extension 763 extending upwardly from the lower portion 762, the lower portion 762 and the extension 763 being integral with each other. The lower portion 762 has a recessed shape along the outer shape of the stay 68S. The lower portion 762 is welded to the stay 68S which is inserted in the recessed shape of the lower portion 762. It is thus easier for the lower portion 762 to have a necessary welded length than if it is devoid of the recessed shape. As shown in FIG. 10, the upward extension 761 is welded while the lower portion 762 is held in abutment against the pedal member 68C, so that the upward extension 761 can accurately be positioned in the vehicle widthwise direction. For the above reasons, the stay 68S and the upward extension 761 are coupled to each other with a sufficient strength, and can be fixed to each other with ease.

Because of the upward extension 761, when the foot (indicated by a reference symbol FT in FIG. 10) of the occupant is placed on the upper treading surface of the pedal member 68C, the foot FT is prevented from moving inwardly in the vehicle widthwise direction. Therefore, the surface of a component that is located inwardly in the vehicle widthwise direction is prevented from being damaged by the foot FT at the time the pedal member 68C is depressed by the foot FT.

As shown in FIG. 7, the extension 763 of the upward extension 761 extends rearwardly and upwardly from the pedal member 68C. The extension 763 extends rearwardly and upwardly at an angle perpendicular or nearly perpendicular to the sole of the foot FT (which protrudes forwardly with its toe directly upwardly) placed on the pedal member 68C. Consequently, inward movement of the foot FT in the vehicle widthwise direction can easily be limited by a vertically wide surface.

The extension 763 has a front edge 763F (see FIG. 7) that is inclined more rearwardly at a tilt angle than a rear edge 763R (see FIG. 7) thereof, i.e., at a tilt angle closer to a horizontal plane than the rear edge 763R. At a position closer to the treading surface (upper surface of the pedal member 68C), therefore, inward movement of the foot in the vehicle widthwise direction can be limited by a relatively wide surface. As the extension 763 is smaller in size in the upward direction, the extension 763 is small in size and weight as a whole.

Furthermore, as the extension 763 is retracted more rearwardly in the upward direction, it is easy to provide a distance by which the extension 763 and the front lower side cover 48R disposed forwardly of the extension 763 are spaced from each other, as shown in FIG. 7. Therefore, in the unbraked position indicated by the solid lines in FIG. 7, the entire upward extension 761 as a whole including the extension 763 is spaced rearwardly from the front lower side cover 48R. Even in the braked position indicated by the two-dot-and-dash lines in FIG. 7, an area where the upward extension 761 and the front lower side cover 48R overlap each other as viewed in side elevation is easily held to a minimum. It is thus easy for the upward extension 761 and the front lower side cover 48R to avoid contacting each other.

Prevention of damage to surfaces will be described in detail below.

Figure 11:
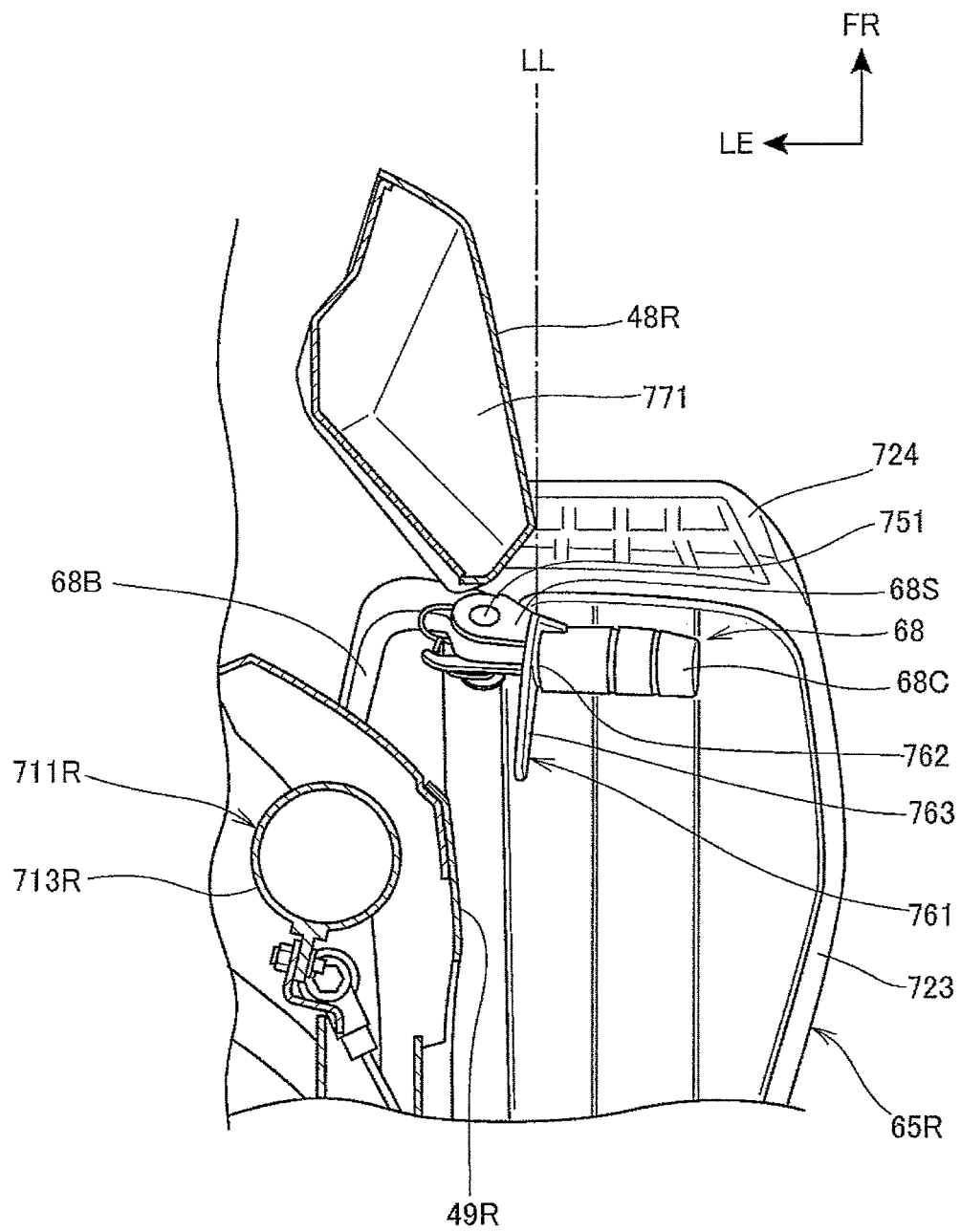
FIG. 11 is a view of the pedal member and the peripheral components as seen from above.

FIG. 11 is a view of the pedal member 68C and the peripheral components as seen from above.

As shown in FIG. 11, the front lower side cover 48R that doubles as a side cover covering part (front wheel 2) of the vehicle body from one side is disposed forwardly of the pedal member 68C. The engine side cover 49R that doubles as a central side cover covering the engine E from one side is disposed inwardly of the pedal member 68C in the vehicle widthwise direction. It is assumed that the pedal member 68C is disposed in a predetermined design position where it can easily be operated by the right foot which protrudes forwardly. FIG. 11 shows the pedal member 68C in the unbraked position.

With the motorcycle 1 according to the present embodiment, the front lower side cover 48R has a wing-shaped portion 771 (see FIG. 7) hanging downwardly in covering relation to a rear upper portion of the front wheel 2 on one side. The wing-shaped portion 771 is disposed closely to the pedal member 68C. More particularly, when the pedal member 68C is in the unbraked position, the pedal member 68C is closest to the wing-shaped portion 771.

Since the engine side cover 49R covers one side of the engine E which is a large-size component that is large longitudinally, transversely, and vertically among the components of the vehicle body, the engine side cover 49R is also disposed closely to the pedal member 68C. Generally, the wing-shaped portion 771 and the engine side cover 49R are resin components that are lower in strength than metal components, and have painted surfaces. Therefore, the surfaces of the wing-shaped portion 771 and the engine side cover 49R tend to be damaged when contacted by the foot of the occupant, and any damage thus caused is easily noticeable.

According to the present arrangement, as shown in FIG. 11, within a range where the upward extension 761 and the pedal member 68C are movable, the upward extension 761 is disposed outwardly of the wing-shaped portion 771 and the engine side cover 49R in the vehicle widthwise direction and in a position where the upward extension 761 extends upwardly from the inner end of the pedal member 68C in the vehicle widthwise direction. Stated otherwise, the wing-shaped portion 771 and the engine side cover 49R are disposed inwardly of the upward extension 761 in the vehicle widthwise direction which extends upwardly from the inner end of the pedal member 68C in the vehicle widthwise direction.

For an easier understanding of the above explanation, FIG. 11 shows a forwardly extended line LL that extends straight through the upward extension 761 in the forward direction of the vehicle body. The upward extension 761 can be held out of contact with the wing-shaped portion 771 and the engine side cover 49R, and prevent the foot placed on the pedal member 68C from damaging the surfaces of the wing-shaped portion 771 and the engine side cover 49R. When the occupant moves a foot from the step 65R onto the pedal member 68C, the upward extension 761 guides the foot to the pedal member 68C.

With the above arrangement, the brake pedal 68 and outer covering components positioned in the periphery of the brake pedal 68 or the like are not required to be spaced from each other in the vehicle widthwise direction. Therefore, the brake pedal 68 does not need to be disposed to be displaced outwardly in the vehicle widthwise direction, and the outer covering components positioned in the periphery of the brake pedal 68 do not need to be changed in position, so that the riding position or the like can appropriately be maintained with ease.

The upward extension 761 should preferably be in the form of a thin plate whose length W (see FIG. 10) in the vehicle widthwise direction is as short as possible insofar as it keeps enough strength or the like to prevent the foot from moving inwardly in the vehicle widthwise direction. As the length W is shorter, it is possible to make the treading surface of the pedal member 68C wider inwardly in the vehicle widthwise direction and also to place the wing-shaped portion 771 and the engine side cover 49R more outwardly in the vehicle widthwise direction, resulting in a greater degree of design freedom.

As shown in FIG. 9, the engine side cover 49R also functions as a central or radiator side cover covering the radiator 28. With the present arrangement, as shown in FIG. 2, the wing-shaped portion 771 has a rear edge 772 spaced from a front edge 774 of the engine side cover 49R, which serves as a front edge of the radiator side cover, in the longitudinal direction of the vehicle. The wing-shaped portion 771 thus arranged prevents the foot of the occupant from being splashed with water from the front wheel 2. Since there is a gap created between the wing-shaped portion 771 and the engine side cover 49R in the longitudinal direction, an air pressure is prevented from building up forwardly of the radiator 28, and air is smoothly ventilated to the radiator 28.

According to the present embodiment, as described above, the brake pedal 68 supported by the step support member 711R is provided with at least the arm 68B extending longitudinally from the step support member 711R and the pedal member 68C mounted on the distal end of the arm 68B and extending in the vehicle widthwise direction, and the upward extension 761 in the form of a plate member extending upwardly from the treading surface of the pedal member 68C is disposed on the inner end of the pedal member 68C in the vehicle widthwise direction. Therefore, the peripheral components in the periphery of the brake pedal 68 are prevented from being damaged even though the brake pedal 68 and the peripheral components are not widely spaced from each other in the vehicle widthwise direction.

The brake pedal 68 further includes the stay 68S between the arm 68B and the pedal member 68C, and the pedal member 68C and the upward extension 761 are welded to the stay 68S. The stay 68S is angularly movable so that the outer end of the pedal member 68C in the vehicle widthwise direction can point upwardly, and the pedal member 68C and the upward extension 761 are angularly moved in unison with each other when the stay 68S is angularly moved. Therefore, even when the pedal member 68C is angularly moved, the pedal member 68C and the upward extension 761 are kept in a constant positional relationship with each other. The foot placed on the pedal member 68C is thus continuously limited against movement in the vehicle widthwise direction.

Since the steps 65L and 65R are angularly movable so that the outer ends thereof in the vehicle widthwise direction can point upwardly, the steps 65L and 65R can automatically be retracted and the pedal member 68C can also be retracted when the vehicle body banks to the left or right at a large tilt angle.

The front lower side cover 48R as a side cover is positioned forwardly of the pedal member 68C, and is positioned inwardly of the forwardly extended line LL (see FIG. 11) that extends through the upward extension 761 in the forward direction of the vehicle body, in the vehicle widthwise direction. The foot placed on the pedal member 68C is thus prevented from contacting the front lower side cover 48R. Thus, the foot does not damage surfaces such as painted surfaces, etc.

As the step 65R is disposed forwardly of the seat 10 as an occupant seat, the occupant rides the vehicle with his or her feet protruding forwardly. In this arrangement, the foot of the occupant is liable to be splashed with water from the front wheel 2. According to the present arrangement, the front lower side cover 48R has the wing-shaped portion 771 overlapping the rear upper portion of the front wheel 2 as viewed in side elevation and hanging downwardly, and the rear edge 772 of the wing-shaped portion 771 has at least a portion spaced from the front edge 774 of the engine side cover 49R, which functions as the central or radiator side cover covering a side of the radiator 28, in the longitudinal direction of the vehicle. The wing-shaped portion 771 prevents the foot of the occupant from being splashed with water from the front wheel 2. Since there is a gap created between the wing-shaped portion 771 and the engine side cover 49R, an air pressure is prevented from building up forwardly of the radiator 28.

Accordingly, in a situation where the occupant rides the vehicle with his or her feet protruding forwardly, the foot of the occupant is less likely to be splashed with water from the front, and the gap created between the wing-shaped portion 771 and the engine side cover 49R is effective to prevent an air pressure from building up forwardly of the radiator 28 and to ventilate air smoothly to the radiator 28.

The engine side cover 49R which functions as the central or radiator side cover covering one side of the engine E is positioned inwardly of the pedal member 68C in the vehicle widthwise direction, and the arm 68B is supported by the shaft 741 that serves as an arm shaft disposed rearwardly of the pedal member 68C. The arm 68B extends forwardly through the opening 705R that is defined in the engine side cover 49R, and the pedal member 68C is mounted on the front end of the arm 68B. Since the arm 68B supports the pedal member 68C from the rear side and extends forwardly through the opening 705R in the engine side cover 49R, the arm 68B has a rear portion covered with the engine side cover 49R for a better appearance.

The above embodiment merely represents one mode of the present invention, and changes or modifications can be made therein without departing from the scope of the present invention.

For example, either one or both the front lower side covers 48L and 48R and the engine side covers 49L and 49R may be dispensed with. Even if both the front lower side covers 48L and 48R and the engine side covers 49L and 49R are dispensed with, portions (step support member 711R, etc.) of the vehicle body frame F and the engine E are present in the periphery of the brake pedal 68, and the peripheral components are prevented from being damaged even though the brake pedal 68 is not largely spaced in the vehicle widthwise direction.

According to the present invention, inasmuch as the peripheral components in the periphery of the brake pedal 68 can be prevented from being damaged, other components than the front lower side covers 48L and 48R and the engine side covers 49L and 49R can further be disposed in the periphery of the brake pedal 68 with ease.

According to the above embodiment, the step support member 711R is provided with the first and second subframes 712R and 713R, the pedal bracket 731, etc. However, the step support member 711R is not limited to such a structure, but may incorporate a wide range of known structures that can support the step 65R and the brake pedal 68.

According to the above embodiment, the present invention is applied to the foot pedal structure of the motorcycle 1. The present invention is not limited to this. However, the present invention is also applicable to a wide range of foot pedal structures for saddle-type vehicles including other vehicle than motorcycles. The saddle-type vehicles cover all vehicles with the rider riding astride the vehicle body, including not only motorcycles (including motorized bicycles) but also three-wheeled vehicles and four-wheeled vehicles classified as ATVs (all terrain vehicles), trikes, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A foot pedal structure for a saddle vehicle in which a step support member supported on a vehicle body frame supports a step for placing thereon a foot of an occupant and a brake pedal operated by the foot of the occupant, comprising:

an arm provided on said brake pedal, said arm extending in a longitudinal direction of the vehicle from said step support member;

a pedal member mounted on a distal end of said arm and extending in a vehicle widthwise direction; and a plate member extending upwardly from a treading surface of said pedal member, said plate member being disposed on an inner end of said pedal member in the vehicle widthwise direction.

2. The foot pedal structure for a saddle vehicle according to claim 1, wherein:

said brake pedal further includes a stay between said arm and said pedal member;

said pedal member and said plate member are welded to said stay; and said stay is angularly movable so that an outer end of said pedal member in the vehicle widthwise direction can point upwardly, and said pedal member and said plate member are angularly moved in unison with each other when said stay is angularly moved.

3. The foot pedal structure for a saddle vehicle according to claim 2, wherein said step is angularly movable so that an outer end of said step in the vehicle widthwise direction can point upwardly.

4. The foot pedal structure for a saddle vehicle according to claim 2, wherein:

a side cover for covering a side of a vehicle body is positioned forwardly of said pedal member; and said side cover is positioned inwardly of a forwardly extended line of said plate member in the vehicle widthwise direction.

5. The foot pedal structure for a saddle vehicle according to claim 2, wherein:

an engine side cover for covering a side of an engine is disposed inwardly of said pedal member in the vehicle widthwise direction; and said arm is supported by an arm shaft disposed rearwardly of said pedal member and extending forwardly through an opening defined in said engine side cover, said pedal member being mounted on a front end of said arm.

6. The foot pedal structure for a saddle vehicle according to claim 1, wherein said step is angularly movable so that an outer end of said step in the vehicle widthwise direction can point upwardly.

7. The foot pedal structure for a saddle vehicle according to claim 6, wherein:

a side cover for covering a side of a vehicle body is positioned forwardly of said pedal member; and said side cover is positioned inwardly of a forwardly extended line of said plate member in the vehicle widthwise direction.

8. The foot pedal structure for a saddle vehicle according to claim 6, wherein:

an engine side cover for covering a side of an engine is disposed inwardly of said pedal member in the vehicle widthwise direction; and said arm is supported by an arm shaft disposed rearwardly of said pedal member and extending forwardly through an opening defined in said engine side cover, said pedal member being mounted on a front end of said arm.

9. The foot pedal structure for a saddle vehicle according to claim 1, wherein:

an engine side cover for covering a side of an engine is disposed inwardly of said pedal member in the vehicle widthwise direction; and said arm is supported by an arm shaft disposed rearwardly of said pedal member and extending forwardly through an opening defined in said engine side cover, said pedal member being mounted on a front end of said arm.

10. The foot pedal structure for a saddle vehicle according to claim 1, wherein:

a side cover for covering a side of a vehicle body is positioned forwardly of said pedal member; and said side cover is positioned inwardly of a forwardly extended line of said plate member in the vehicle widthwise direction.

11. The foot pedal structure for a saddle vehicle according to claim 10, wherein:

said step is disposed forwardly of an occupant seat; and said side cover has a wing-shaped portion overlapping a rear upper portion of a front wheel as viewed in a side elevation and hanging downwardly, and a rear edge of said wing-shaped portion has at least a portion spaced from a front edge of an engine side cover covering a side of a radiator in the longitudinal direction.

12. The foot pedal structure for a saddle vehicle according to claim 10, wherein:

an engine side cover for covering a side of an engine is disposed inwardly of said pedal member in the vehicle widthwise direction; and said arm is supported by an arm shaft disposed rearwardly of said pedal member and extending forwardly through an opening defined in said engine side cover, said pedal member being mounted on a front end of said arm.

13. A foot pedal structure for a saddle vehicle comprising:

a step support member supported on a vehicle body frame, said step support adapted for supporting a foot of an occupant;

a brake pedal adapted to be operated by the foot of the occupant, said brake pedal including a treading surface;

at least one arm provided on said brake pedal, said at least one arm extending in a longitudinal direction of the vehicle from said step support member;

a pedal member mounted on a distal end of said at least one arm and extending in a vehicle widthwise direction; and a plate member extending upwardly from the treading surface of said pedal member;

wherein said plate member is disposed on an inner end of said pedal member in the vehicle widthwise direction.

14. The foot pedal structure for a saddle vehicle according to claim 13, wherein:

said brake pedal further includes a stay between said at least one arm and said pedal member;

said pedal member and said plate member are welded to said stay; and said stay is angularly movable so that an outer end of said pedal member in the vehicle widthwise direction can point upwardly, and said pedal member and said plate member are angularly moved in unison with each other when said stay is angularly moved.

15. The foot pedal structure for a saddle vehicle according to claim 14, wherein:

a side cover for covering a side of a vehicle body is positioned forwardly of said pedal member; and said side cover is positioned inwardly of a forwardly extended line of said plate member in the vehicle widthwise direction.

16. The foot pedal structure for a saddle vehicle according to claim 14, wherein said step is angularly movable so that an outer end of said step in the vehicle widthwise direction can point upwardly.

17. The foot pedal structure for a saddle vehicle according to claim 13, wherein:

a side cover for covering a side of a vehicle body is positioned forwardly of said pedal member; and said side cover is positioned inwardly of a forwardly extended line of said plate member in the vehicle widthwise direction.

18. The foot pedal structure for a saddle vehicle according to claim 13, wherein said step is angularly movable so that an outer end of said step in the vehicle widthwise direction can point upwardly.

19. The foot pedal structure for a saddle vehicle according to claim 17, wherein:

said step is disposed forwardly of an occupant seat; and said side cover has a wing-shaped portion overlapping a rear upper portion of a front wheel as viewed in a side elevation and hanging downwardly, and a rear edge of said wing-shaped portion has at least a portion spaced from a front edge of an engine side cover covering a side of a radiator in the longitudinal direction.

20. The foot pedal structure for a saddle vehicle according to claim 13, wherein:

an engine side cover for covering a side of an engine is disposed inwardly of said pedal member in the vehicle widthwise direction; and said at least one arm is supported by an arm shaft disposed rearwardly of said pedal member and extending forwardly through an opening defined in said engine side cover, said pedal member being mounted on a front end of said at least one arm.

* * * * *